United States Patent
Yao et al.

(10) Patent No.: US 10,691,235 B2
(45) Date of Patent: Jun. 23, 2020

(54) ON-CELL TOUCH ARCHITECTURE

(71) Applicant: Apple Inc., Cupertino, CA (US)

(72) Inventors: Weijun Yao, San Jose, CA (US); Wei Hsin Yao, Palo Alto, CA (US); Yingxuan Li, Saratoga, CA (US); Hopil Bae, Sunnyvale, CA (US); Ahmad Al-Dahle, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 985 days.

(21) Appl. No.: 14/256,849

(22) Filed: Apr. 18, 2014

(65) Prior Publication Data

US 2015/0169121 A1 Jun. 18, 2015

Related U.S. Application Data

(60) Provisional application No. 61/916,044, filed on Dec. 13, 2013.

(51) Int. Cl.
*G06F 3/045* (2006.01)
*G06F 3/041* (2006.01)
*G06F 3/044* (2006.01)

(52) U.S. Cl.
CPC .......... *G06F 3/0412* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |

(Continued)

FOREIGN PATENT DOCUMENTS

| CN | 102760405 A | * 10/2012 | ............. G06F 3/044 |
|---|---|---|---|
| JP | 2000-163031 A | 6/2000 | |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Lunyi Lao
*Assistant Examiner* — Kirk W Hermann
(74) *Attorney, Agent, or Firm* — Kubota & Basol LLP

(57) ABSTRACT

Integrated touch screens are provided including drive lines formed of grouped-together circuit elements of a thin film transistor layer and sense lines formed between a color filter layer and a material layer that modifies or generates light. The common electrodes (Vcom) in the TFT layer can be grouped together during a touch sensing operation to form drive lines. Sense lines can be formed on a separate layer dedicated to only touch hardware.

9 Claims, 10 Drawing Sheets

(56) References Cited

U.S. PATENT DOCUMENTS

| | | | |
|---|---|---|---|
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 8,502,796 B1 | 8/2013 | Yilmaz | |
| 2006/0197753 A1 | 9/2006 | Hotelling | |
| 2008/0122796 A1* | 5/2008 | Jobs | G06F 3/0488 345/173 |
| 2010/0060591 A1* | 3/2010 | Yousefpor | G06F 3/044 345/173 |
| 2011/0061949 A1* | 3/2011 | Krah | G06F 3/0418 178/18.06 |
| 2012/0105325 A1* | 5/2012 | Brosnan | G06F 1/1626 345/158 |
| 2012/0206407 A1* | 8/2012 | Taylor | G06F 3/044 345/174 |
| 2012/0249465 A1* | 10/2012 | Lin | G06F 3/041 345/173 |
| 2013/0021289 A1* | 1/2013 | Chen | G06F 1/1601 345/174 |
| 2013/0044074 A1 | 2/2013 | Park et al. | |
| 2013/0285976 A1* | 10/2013 | Kuo | G06F 3/0416 345/174 |
| 2014/0210738 A1* | 7/2014 | Hur | G06F 3/0412 345/173 |
| 2015/0194470 A1* | 7/2015 | Hwang | G06F 3/044 345/173 |

FOREIGN PATENT DOCUMENTS

| | | |
|---|---|---|
| JP | 2002-342033 A | 11/2002 |
| WO | WO-2007/146785 A2 | 12/2007 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

ON-CELL TOUCH ARCHITECTURE

FIELD OF THE DISCLOSURE

This relates generally to touch sensor panels that are integrated with displays, and more particularly, to integrated touch sensors/displays in which one layer of touch sensor panel is located between a TFT glass and a color filter glass of the display while another layer of the touch sensor panel is disposed externally to the display, thus forming a partially integrated on-cell touch architecture.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by partially integrating touch sensing circuitry into a display pixel stackup (i.e., the stacked material layers forming the display pixels).

SUMMARY

The following description includes examples of integrated touch screens including drive lines or sense lines formed of grouped-together circuit elements of a liquid crystal display (LCD) or organic light emitting diode (OLED) display, and drive lines or sense lines formed in a layer that is external to the display. In an LCD display, the common electrodes (Vcom) in the TFT layer can be grouped together during a touch sensing operation to form drive lines. Sense lines can be disposed in a separate layer external to the display circuitry Placing the sense lines external to the display hardware can provide a benefit of improving bandwidth of the touch sensor panel as well as removing potential sources of parasitic capacitance that could degrade the touch sensor panel's performance.

DETAILED DESCRIPTION

In the following description of examples, reference is made to the accompanying drawings which form a part hereof, and in which it is shown by way of illustration specific examples in which examples of the disclosure can be practiced. It is to be understood that other examples can be used and structural changes can be made without departing from the scope of the examples of this disclosure.

The following description includes examples of integrated touch screens including drive lines formed of grouped-together circuit elements of a thin film transistor layer and sense lines formed in layer external to the display layers in a stack-up. In some examples, the touch screen can utilize an in-plane switching (IPS) liquid crystal display (LCD), fringe field switching (FFS), advanced fringe field switching (AFFS), etc. The common electrodes (Vcom) in the TFT layer can be grouped together during a touch sensing operation to form drive lines.

During a display operation, in which an image is displayed on the touch screen, the Vcom can serve as part of the display circuitry, for example, by carrying a common voltage to create, in conjunction with a pixel voltage on a pixel electrode, an electric field across the liquid crystal. During a touch sensing operation, the stimulation signal can be applied to a group of Vcom that form a drive line. A sense signal based on the stimulation signal can be received by the sense lines and processed by a touch processor to determine an amount and location of touch on the touch screen.

Figure 1C:
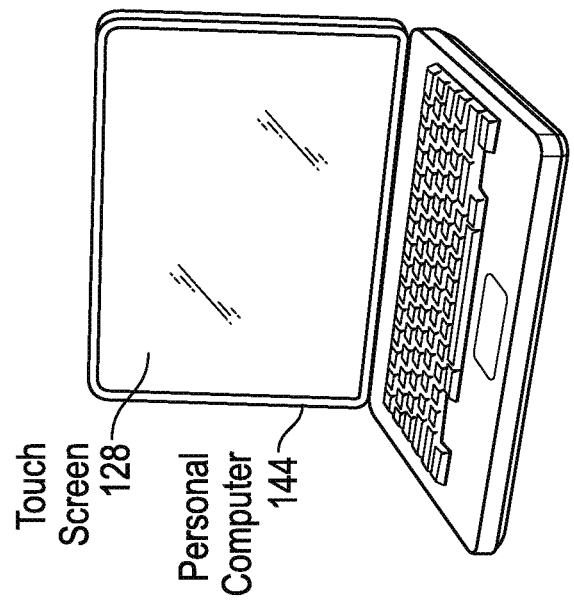
FIGS. 1A-1C illustrate an example mobile telephone, an example media player, and an example personal computer that each include an example touch screen according to examples of the disclosure.
Figure 1B:
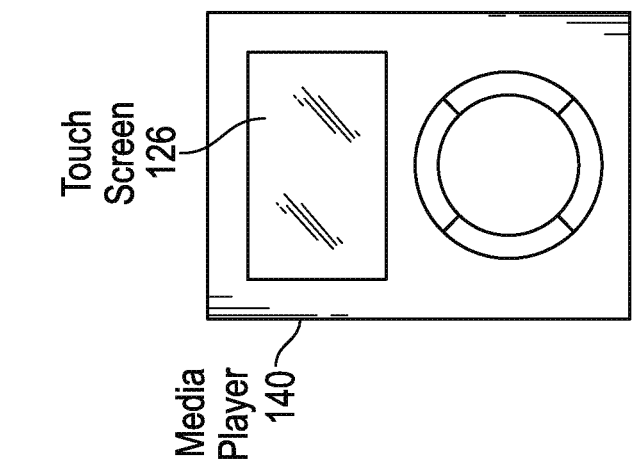
Figure 1A:
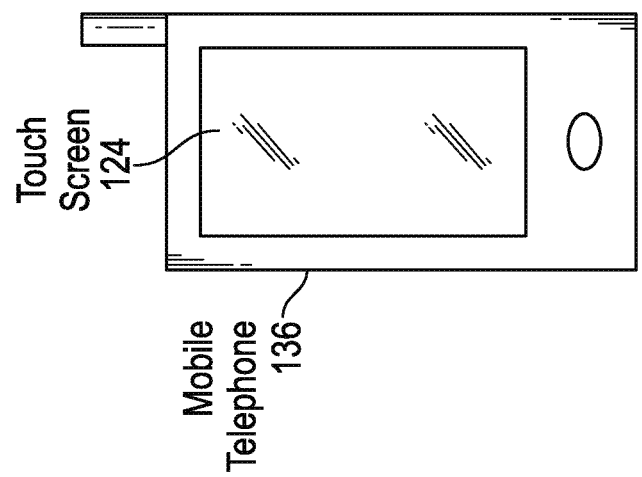

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Touch screens 124, 126, and 128 can be based on mutual capacitance. A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, capacitive touch, etc.

Figure 2:
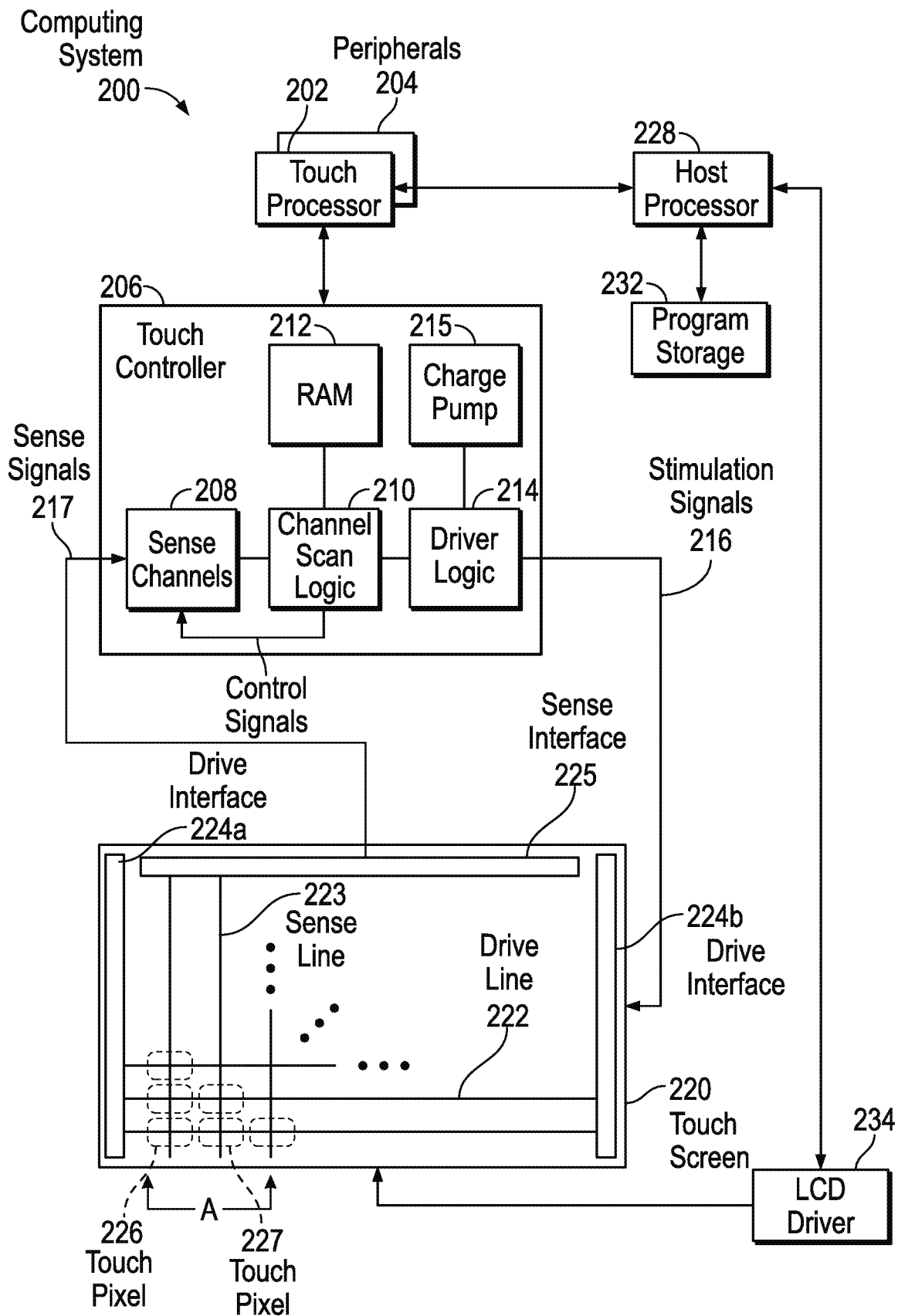
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive lines of the touch sensing circuitry of touch screen 220, as described in more detail below. In some examples, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction and includes pathways of different sizes, shapes, materials, etc., and multiple electrically conductive circuit elements that can be electrically connected to form a single electrically conductive pathway. Drive lines 222 can be driven by stimulation signals 216 from driver logic 214 through drive interfaces 224a and 224b, and resulting sense signals 217 generated in sense lines 223 can be transmitted through a sense interface 225 to sense channels 208 (also referred to as an event detection and demodulation circuit) in touch controller 206. The stimulation signal may be an alternating current (AC) waveform. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined an amount of touch detected at each touch pixel in the touch screen, the pattern of touch pixels in the touch screen at which a touch occurred can be thought of as an "image" of touch (e.g. a pattern of fingers touching the touch screen).

Figure 3:
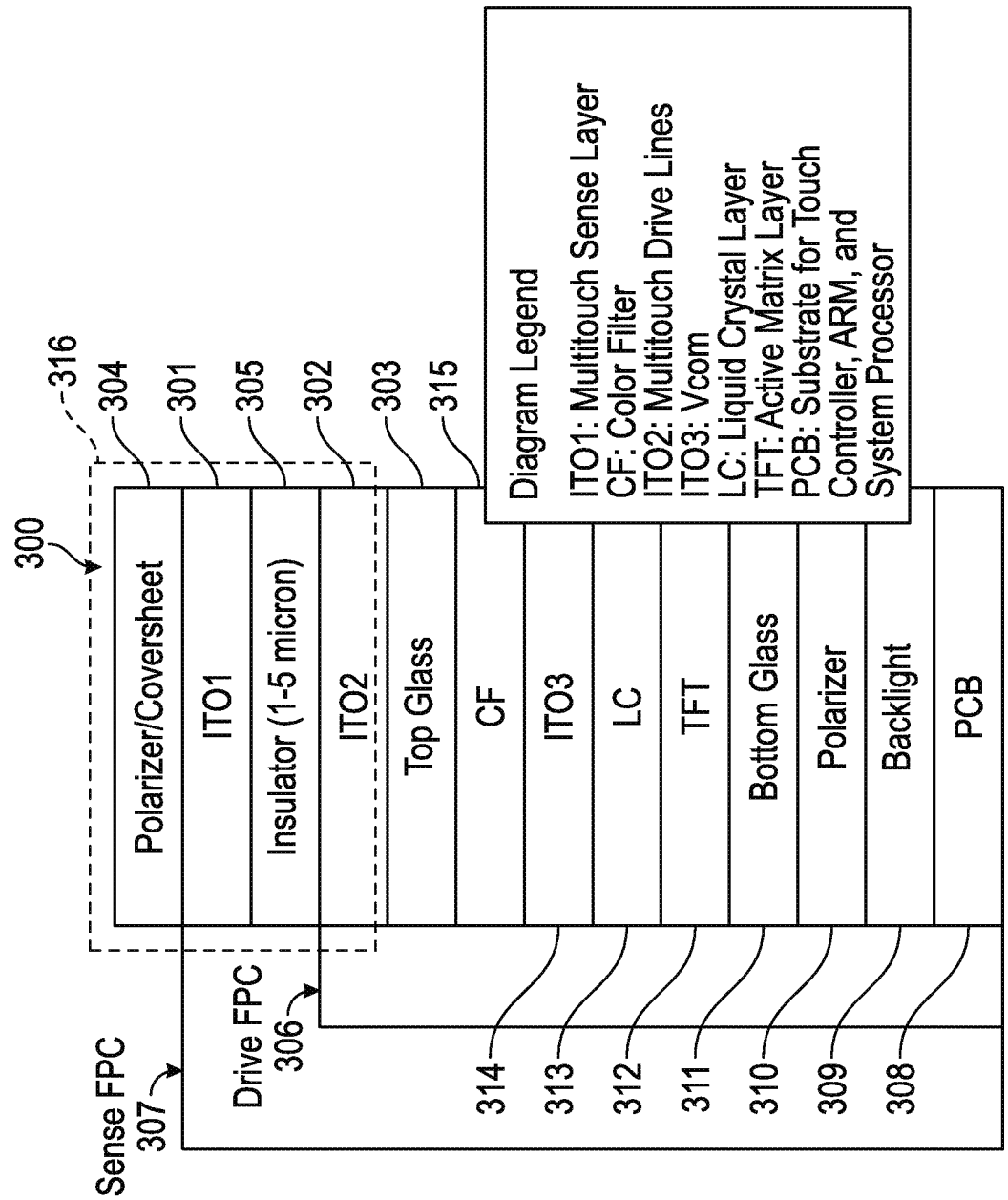
FIG. 3 illustrates an exemplary stack-up of a display and external touch sensor panel according to examples of the disclosure.

FIG. 3 illustrates an exemplary stack-up of a display and external touch sensor panel according to examples of the disclosure. As illustrated in FIG. 3, the touch sensor panel 316 can be separated from the display, with one being stacked on top of the other. As part of the touch sensor panel 316, two indium-tin oxide (ITO) layers (ITO1 301 and ITO2 302) can be patterned on top of a color filter (CF) plate (e.g., the top glass layer). These layers can be used for the touch sense and touch drive elements of a touch sensor, e.g., a mutual-capacitance touch sensor. These ITO layers can be patterned into columns and/or rows (as shown in FIG. 2, and described in the preceding multi-touch sensing description), and can be separated by a dielectric 305, such as a glass substrate or a thin (e.g., 5-12 mm) $SiO_2$ layer.

The display portion of the stack-up can include a backlight 309 and a polarizer 310 that can be disposed beneath a bottom glass 311. The various components of a display such as a color filter 315, a $V_{com}$ layer 314 that can be made of ITO, a liquid crystal (LC) layer 313 and a TFT layer 312 can be disposed between the bottom glass 311 and the top glass 303.

When a touch sensor panel is stacked on top of a display, the combined stack-up can lead to a device that has an increased thickness since both the display and the touch sensor panel individually add to the overall thickness of the device. Integrating the touch sensor panel into a display such that both the display and the touch sensor panel can share layers may reduce the number of layers needed to implement both touch and display capabilities thus reducing the overall thickness of the touch sensitive device. Also, integrating the layers such that layers are shared can lead to other benefits such as power savings and reduced noise during touch detection.

In order to integrate layers such that both the touch sensor panel and the display share a layer, the circuit elements of a particular layer may be used as both display hardware and touch hardware. The touch functionality and the display functionality of the device can be time multiplexed (as will be described below) such that during a touch mode, the circuit elements of the common layer can be used as touch circuitry and during a display mode the circuit elements of the common layer can be used as display circuitry.

Figure 4:
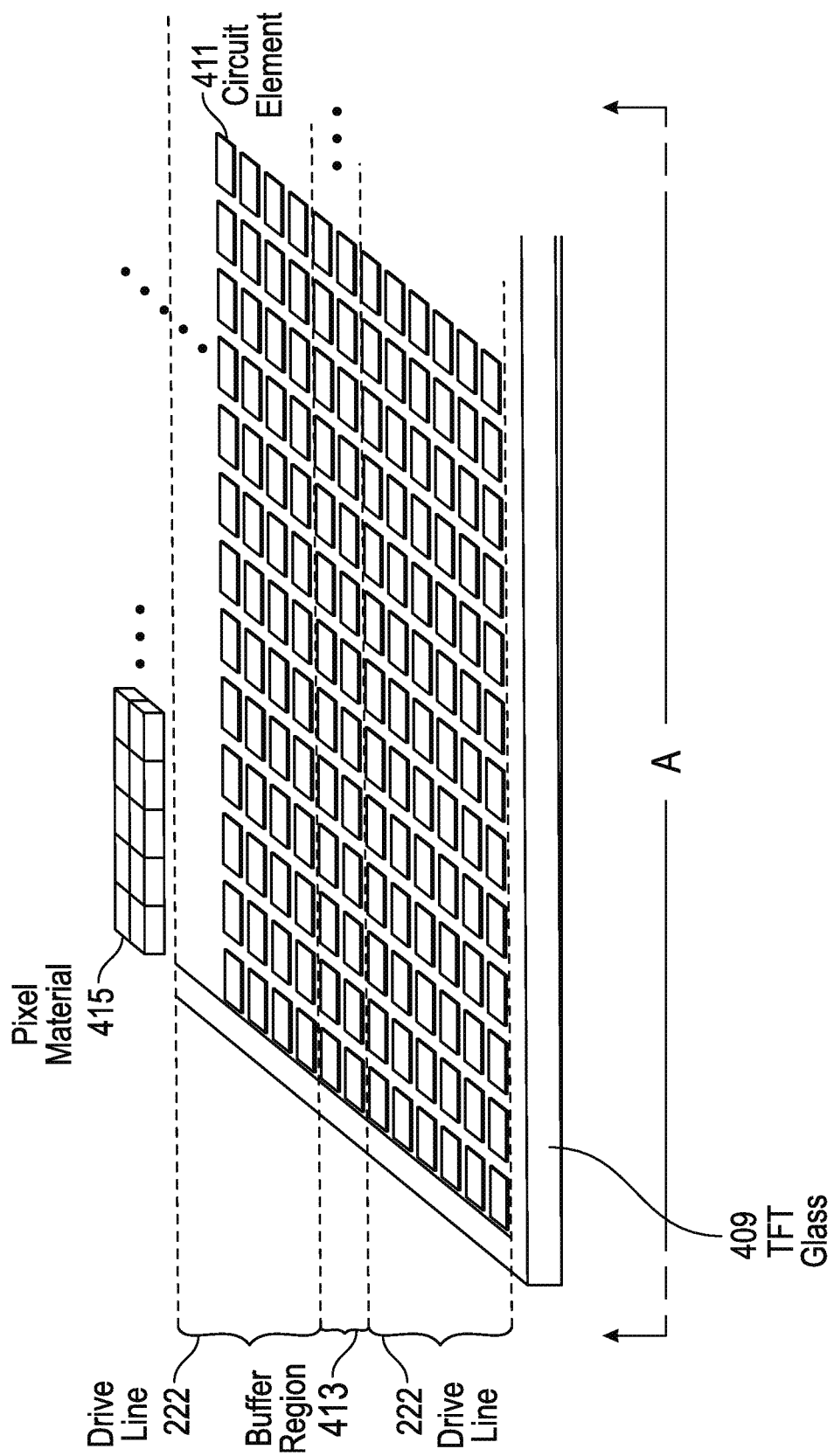
FIG. 4 illustrates an exemplary stack-up layer that can be used as both touch circuitry and display circuitry according to examples of the disclosure.

FIG. 4 illustrates an exemplary stack-up layer that can be used as both touch circuitry and display circuitry according to examples of the disclosure. In the example of FIG. 4, the $V_{com}$ layer 314 (see FIG. 3) can be modified such that circuit elements residing on the $V_{com}$ layer can be used as display circuitry during a display mode of the device and as touch circuitry during a touch mode of the device. TFT glass 409 can have circuit elements 411 formed on it. Circuit elements 411 can constitute the $V_{com}$ layer of a display. Circuit elements 411 can be, for example, multi-function circuit elements that operate as part of the display circuitry of the touch screen and also as part of the touch sensing circuitry of the touch screen. In some examples, circuit elements 411 can be single-function circuit elements that operate only as part of the touch sensing system. In addition to circuit elements 411, other circuit elements (not shown) can be formed on TFT glass 409, such as transistors, capacitors, conductive vias, data lines, gate lines, etc. Circuit elements 411 and the other circuit elements formed on TFT glass 409 can operate together to perform various display functionality required for the type of display technology used by a touch screen, as one skilled in the art would understand. The circuit elements can include, for example, elements that can exist in conventional LCD displays. It is noted that circuit elements are not limited to whole circuit components, such a whole capacitor, a whole transistor, etc., but can include portions of circuitry, such as only one of the two plates of a parallel plate capacitor.

Some of the circuit elements 411 can be electrically connected together such that the circuit elements 411 and their interconnections together form drive lines 222. Some of the circuit elements 411 that lie between drive lines 222 can serve as a buffer region 413. One purpose of the buffer region 413 can be to separate drive lines 222 from one another to reduce or to prevent cross talk and stray capacitance effects. Circuit elements 411 in buffer region 413 can, for example, be unconnected from drive lines 222. In various examples, some or all of the circuit elements 411 in buffer region 413 can be, for example, electrically connected to each other, electrically unconnected from each other, maintained at a fixed voltage during a touch sensing operation, maintained at a floating potential during a touch sensing operation, etc. Although not illustrated in FIG. 4, it is understood that first and second polarizers can be provided, the first polarizer can be adjacent the TFT glass and the second polarizer can be adjacent the color filter glass such that the TFT glass and the color filter glass are disposed between the first and second polarizers.

FIG. 4 also shows a pixel material 415 disposed between TFT glass 409 and a color filter glass (see FIG. 3). Pixel material 415 is shown in FIG. 4 as separate volume regions or cells above the circuit elements 411. For example, when the pixel material is a liquid crystal, these volume regions or cells are meant to illustrate regions of the liquid crystal controlled by the electric field produced by the pixel electrode and common electrode of the volume region or cell under consideration. Pixel material 415 can be a material that, when operated on by the display circuitry of a touch screen, can generate or control an amount, color, etc., of light produced by each display pixel. For example, in an LCD touch screen, pixel material 415 can be formed of liquid crystal, with each display pixel controlling a volumn region or cell of the liquid crystal. In this case, for example, various methods exist for operating liquid crystal in a display operation to control the amount of light emanating from each display pixel, e.g., applying an electric field in a particular direction depending on the type of LCD technology employed by the touch screen. In an in-plane switching (IPS), fringe field swithing (FFS), and advanced fringe field switching (AFFS) LCD displays, for example, electrical fields between pixel electrodes and common electrodes (Vcom) disposed on the same side of the liquid crystal can operate on the liquid crystal material to control the amount of light from a backlight that passes through the display pixel. One skilled in the art would understand that various pixel materials can be used, depending on the type of display technology of the touch screen.

Figure 5:
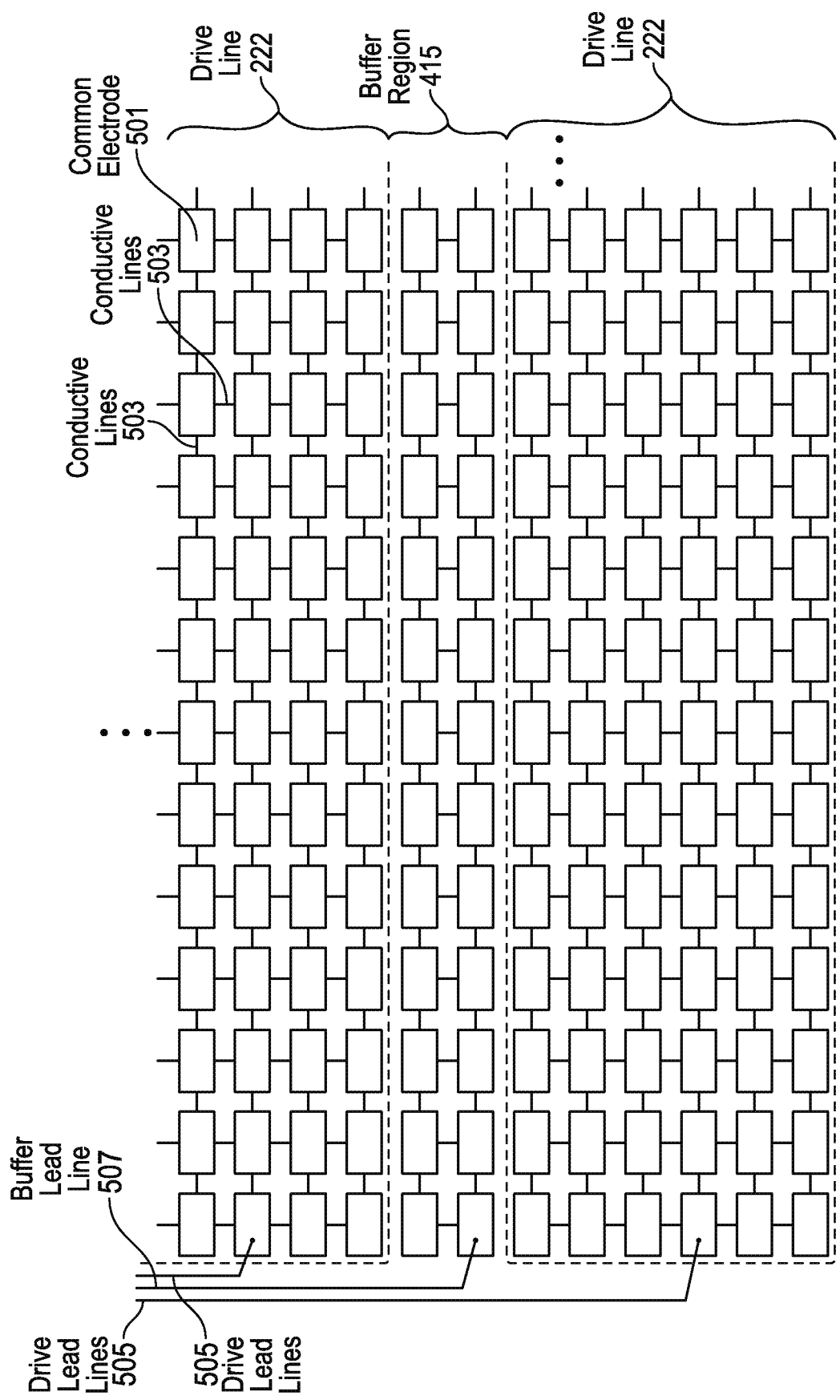
FIG. 5 illustrates a more detailed view of an example configuration of drive lines and buffer regions on an integrated touch and display layer according to various examples.

FIG. 5 illustrates a more detailed view of an example configuration of drive lines 222 and buffer regions 413 on a TFT layer according to various examples. In this example, circuit elements 411 can include common electrodes 501. Common electrodes 501 can be operated as multi-function circuit elements that can operate as part of the display circuitry in a display operation and can operate as part of the touch sensing circuitry in a touch sensing operation of the touch screen. Common electrodes 501 can be electrically connected together with conductive lines 503, to form the required regions such as regions that operate as drive lines 222 and regions that operate as buffer regions 413. In this example, common electrodes functional region can be physically connected with fixed conductive lines. In other words, the common electrodes in each region can be permanently connected through the physical design of the touch screen. In other words, common electrodes 501 can be grouped together to form drive lines. Grouping multi-function circuit elements of display pixels can include operating the multi-function circuit elements of the display pixels together to perform a common function of the group. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Stimulation signals can be applied to drive lines 222 through drive lead lines 505. For example, drive lead lines can be electrically connected to driver logic 214, which can provide the stimulation signals during the touch sensing operation. Buffer region 413 can be connected to a buffer lead line 507, which can be connected to a buffer operator (not shown). In other examples, the stimulation signals can be applied directly lines 222 directly with the use of drive lead lines 505.

In the example shown in FIG. 5, each common electrode (Vcom) 501 can serve as a multi-function circuit element that can operate as display circuitry of the display system of touch screen 220 and can also operate as touch sensing circuitry of the touch sensing system. In this example, each common electrode 501 can operate as a common electrode of the display circuitry of the touch screen, and can also operate together when grouped with other common electrodes as touch sensing circuitry of the touch screen. For example, a group of common electrodes 501 can operate together as a part of a drive line of the touch sensing circuitry during the touch sensing operation. Other circuit elements of touch screen 220 can form part of the touch sensing circuitry by, for example, electrically connecting together common electrodes 501 of a region, switching electrical connections, etc. Each display pixel can include a common electrode 501, which can be a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

Figure 6:
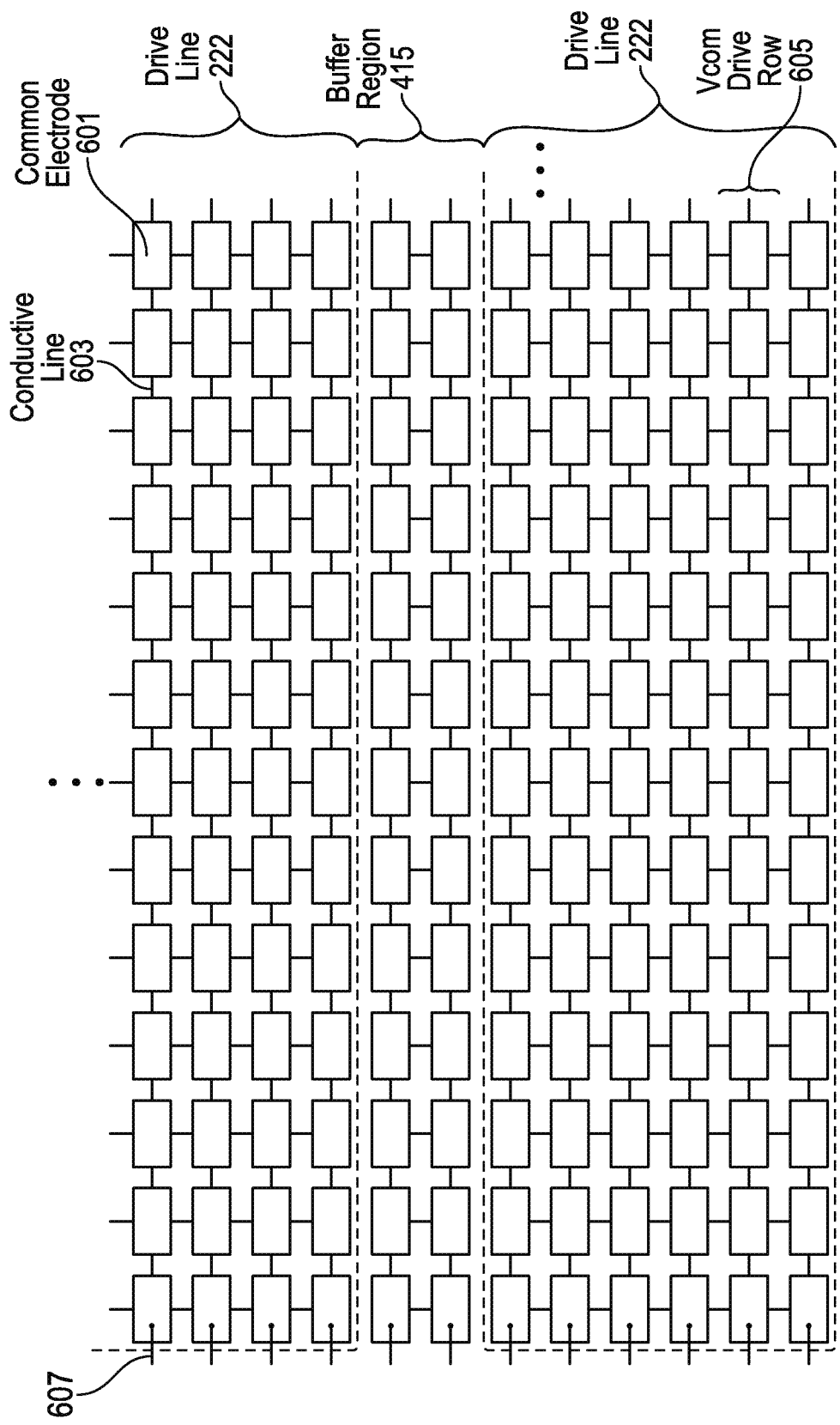
FIG. 6 illustrates a more detailed view of an example configuration of drive lines and buffer regions on an integrated touch and display layer according to various examples.

In the example shown in FIG. 6, the circuit elements used to form drive lines, Vcom 601 in this example, can be physically connected together on the TFT glass through conductive lines 603 to form individual rows of connected together Vcom 601. The individual rows of Vcom, i.e., Vcom drive rows 605, can be connected together with other Vcom drive rows in the periphery using contact pads 607. In this example, each drive line 222 can be formed through fixed electrical connections.

Figure 7:
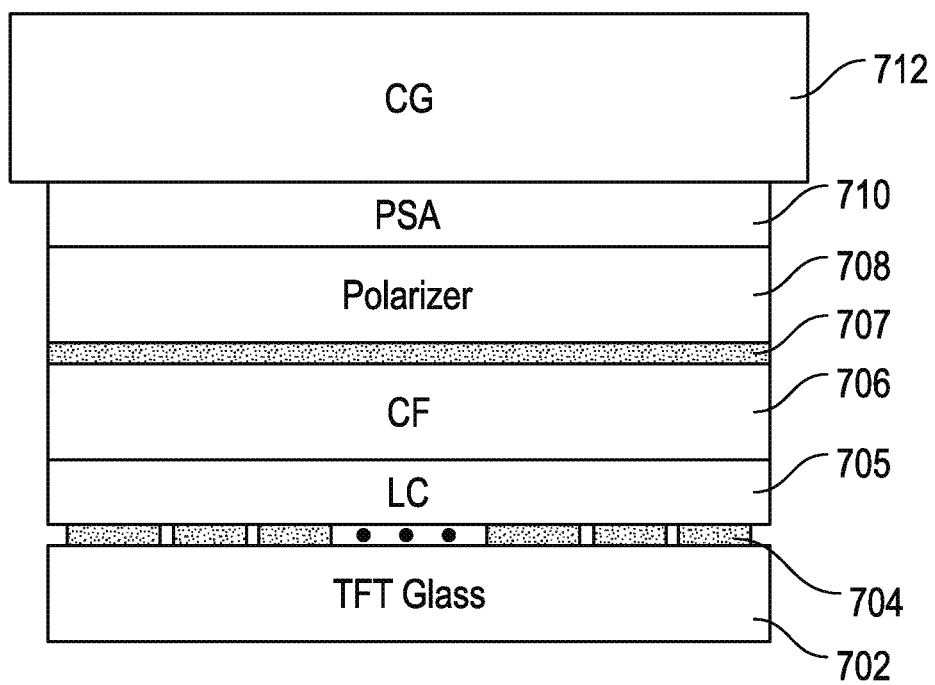
FIG. 7 illustrates an on-cell touch and display configuration according to examples of the disclosure.

FIG. 7 illustrates an on-cell touch and display configuration according to examples of the disclosure. As discussed above, if a $V_{com}$ layer of the display can be switchably configured to operate as touch hardware during a touch sensing mode and as display hardware during a display mode, the number of layers that make up the combined touch/display stack-up can be reduced. As illustrated in FIG. 7 and discussed above, since the $V_{com}$ layer can have the drive line functionality integrated into it, there may no longer be a need to have a separate stand-alone ITO layer that contains the drive lines. In the example illustrated in FIG. 7, the stack-up can be similar to the stack-up illustrated in FIG. 3, the exception being that the ITO 2 layer 302 of FIG. 3 can be removed since its functionality can be integrated into the Vcom layer. Thus, the stack-up can appear as follows: A TFT glass 702 can have an ITO layer 704 deposited onto it. The ITO layer 704 can contain circuit elements that can be used as both display hardware and touch hardware according to the discussion above. A liquid crystal layer 705 can be deposited between the ITO layer 704 and a color filter layer 706. A second ITO layer 707 can be deposited between the polarizer 708 and the color filter 706. A cover glass 712 can be attached via pressure sensitive adhesive (PSA) layer 710 at the top of the stack-up.

Integrating a portion of the touch sensor panel with the display can provide many benefits. For example, by having the drive lines proximal to the TFT glass, the drive lines can be directly connected to a stimulation source buffer rather than having a wire go from the stimulation source buffer out to the ITO layer as depicted in FIG. 3 by drive flexible printed circuit (FPC) 306. In other examples, the drive FPC 306 can still be required but can be shorter in length since the drive lines are closer to the drive electronics. Having the drive lines located closer to the stimulation sources can increase the bandwidth of the touch sensor by decreasing the resistance seen by the stimulation signal, thus lowering the RC time constant. Also, shortening the distance between a stimulation signal and the drive line can better accommodate a multi-stimulation driving scheme in which the drive lines are all driven concurrently.

Figure 8:
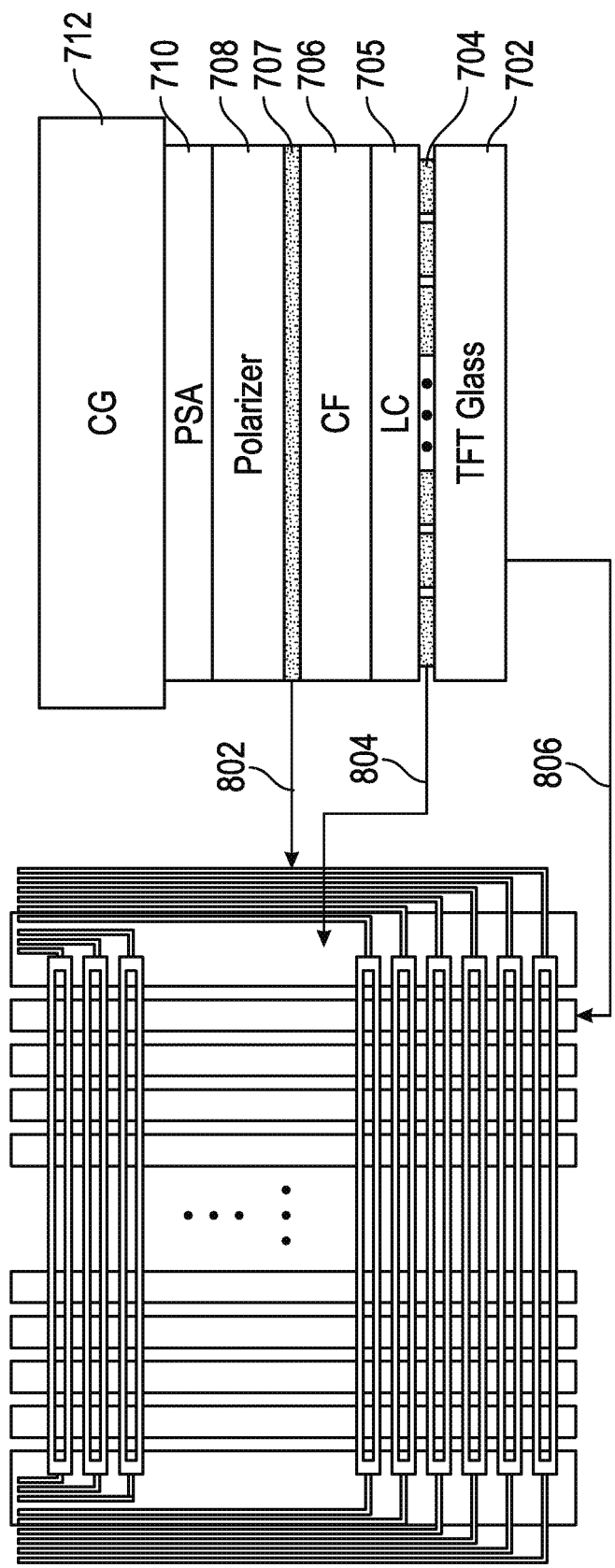
FIG. 8 illustrates an exemplary overview of the interaction between the various layers of the stack-up depicted in FIG. 7.

FIG. 8 illustrates an exemplary overview of the interaction between the various layers of the stack-up depicted in FIG. 7. The ITO layer 707 can be patterned as sense lines 802 while the ITO layer 704 can be patterned in part as drive lines 806. By disposing the two layers 707 and 704 on top of each other, the drive lines and sense lines can be arranged as described above in FIG. 2.

Figure 9:
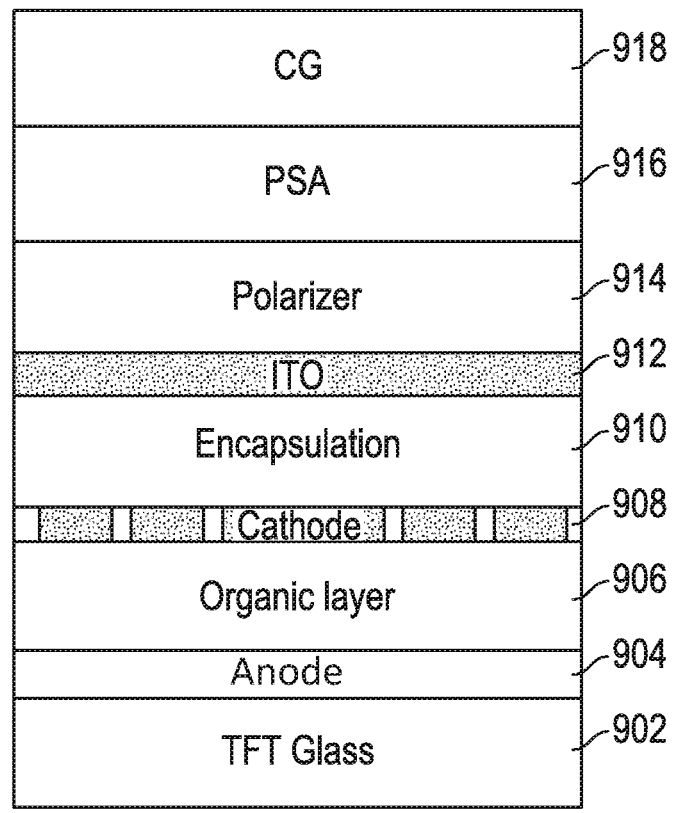
FIG. 9 illustrates an exemplary stack-up of an organic light emitting diode (OLED) display and touch sensor in an on-cell configuration.

While the discussion above focuses on liquid crystal displays, the disclosure is not so limited and can be applicable to other types of displays. FIG. 9 illustrates an exemplary stack-up of an organic light emitting diode (OLED) display and touch sensor in an on-cell configuration. As illustrated in FIG. 9, an OLED structure can include an encapsulation layer 910, a cathode layer 908, an organic layer 906 that includes organic light emitting diodes, and an anode layer 904 that can be disposed on top of a TFT glass 902. The stack-up can further include an ITO layer 912 that is patterned with the drive lines similar to the drive lines 222 depicted at FIG. 2, a polarizer 914, a pressure sensitive adhesive layer 916, and a cover glass 918. The cathode layer 908 can contain circuit elements that act as cathodes to an OLED display during a display mode of the device and act as sense lines during a touch mode of the device.

It should be noted that in the example of FIG. 9, the circuit elements that are switchably configurable to act as touch hardware or display hardware can be configured to act as sense lines, while in the example of FIG. 7 the circuit elements can be configured to act as drive lines. This is because in any integrated display and touch stack-up, the common layer used by both the display and the touch sensor can be patterned as sense lines or drive lines interchangeably. In other words, ITO layer 704 of FIG. 7 can also be patterned to function as sense lines, while ITO layer 707 can be patterned to function as drive lines. ITO layer 910 of FIG. 9 can be patterned as sense lines, while the cathode layer 906 can be patterned as drive lines. However, if the cathode layer is to be used as drive lines during a touch detection mode, when the drive lines are stimulated, the anode of the OLED display will also have to be stimulated in order to ensure that there is substantially no DC current flowing across the organic layer between the cathode and the anode during a touch mode.

Figure 10:
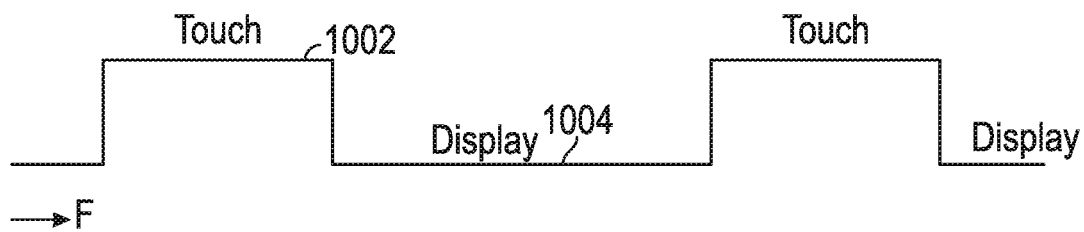
FIG. 10 illustrates an exemplary time line for operating the device in a touch detection mode and a display operation mode.

FIG. 10 illustrates an exemplary time line for operating the device in a touch detection mode and a display operation mode. As illustrated, a touch detection mode 1002 can be alternated with a display operation mode 1004 such that the two modes are mutually exclusive in time. In other words, the two modes 1002 and 1004 can be multiplexed in time. The duration in time of each mode can vary and can depend on other functions of the device. For example, the touch detection mode can occur while the display is in a vertical blanking mode. In addition, although examples herein may describe the display circuitry as operating during a display operation, and describe the touch sensing circuitry as operating during a touch sensing operation, it should be understood that a display operation and a touch sensing operation may be operated at the same time, e.g., partially or completely overlap, or the display operation and touch phase may operate at different times.

During a touch mode of the device, the drive lines may be stimulated in various different patterns. For instance, in one example, each individual drive line can be stimulated one at a time while the other drive lines are grounded. When every drive line has been stimulated and subsequently sensed using sense circuitry as described above, a touch image can be rendered. This method can be known as single-stimulation or "single-stim."

Figure 11:
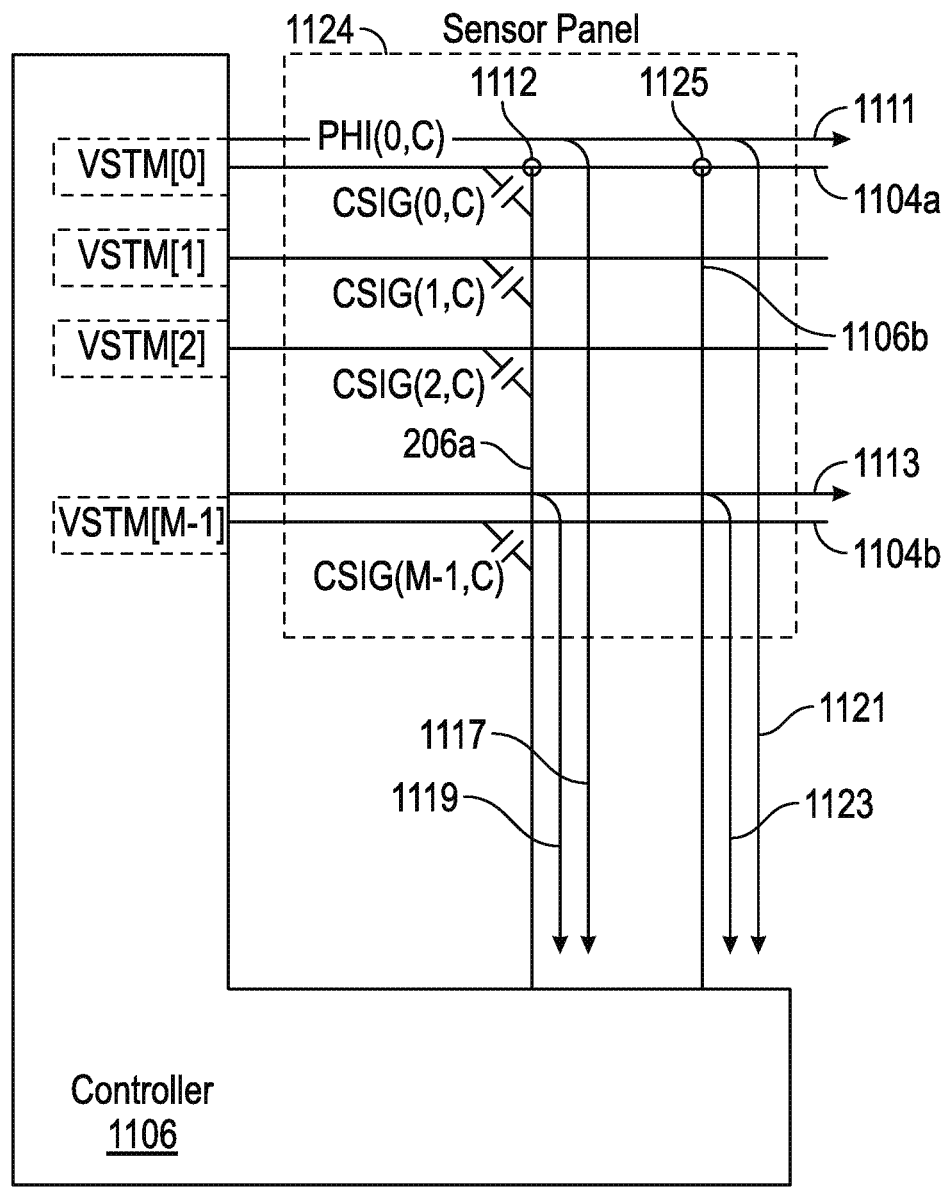
FIG. 11 illustrates that the length of a signal path from a transmit channel to a sense channel can be different depending on the particular drive line and sense line pair.

In other examples, the drive lines can be simultaneously stimulated. FIG. 11 illustrates an example stimulation of touch sensor panel according to examples of the disclosure. In particular, FIG. 11 illustrates signal paths of drive signals through rows 1104 and sense signals through columns 1106 of touch sensor panel 1124. FIG. 11 shows touch controller 1106 driving and sensor panel 1124 during one step of a scan of the sensor panel. In FIG. 11, touch controller 1106 is shown having M drive lines (rows) 204 and N sense lines (columns), respectively, of sensor panel 1124. Drive lines 1104 transmit drive signals Vstim[0], Vstim[1], . . . Vstim[M-1] through the touch sensor panel 1124. Sense signals SenseSig[0], SenseSig[1], . . . SenseSig[N-1] are generated as a result of signal charges Qsig injected into the sense lines 1106 of each pixel driven with Vstim, in proportion to the signal capacitances Csig of the pixels, as described above. Assuming a linear system, the total signal charge Qsig_tot injected into a sense line 206 is the sum of the signal charges injected at each pixel of the sense channel C:

$$Qsig\_tot_C = Qsig_C(0) + Qsig_C(1) + \ldots + Qsig_C(M-1) \quad (1)$$

where $Qsig_C(R)$ is the injected charge at the pixel corresponding to drive line R of sense channel C. Thus, referring to equation (1) above:

$$Qsig\_tot_C = Vstim(0) \times Csig_C(0) + Vstim(1) \times Csig_C(1) + \ldots Vstim(M-1) \times Csig_C(M-1) \quad (2)$$

At each step in a scan of sensor panel 1124, a Qsig_tot$_C$ is generated in each sense channel when drive lines 1104 are driven with particular drive signals. A complete scan of sensor panel 1124 results in a plurality of Qsig_tot$_C$ measurements, i.e., one Qsig_tot$_C$ per channel per step. For a scan having P steps, equation (2) can be written as a series of equations, one equation for each step in the scan of sense channel C:

$$Qsig\_tot_C(S) = Vstim \times \cos(Pz\_stim_C(0, S)) \times Csig_C(0) + \quad (3)$$
$$Vstim \times \cos(Pz\_stim_C(1, S)) \times Csig_C(1) + $$
$$\ldots Vstim \times \cos(Pz\_stim_C((M-1), S)) \times Csig_C(M-1)$$

where:

$S$ = step index (from 0 to $P-1$)

$C$ = channel index (from 0 to $N-1$)

Qsig_tot$_C(S)$ = Qsig_tot for sense channel $C$ at step $S$ $$Pz\_stim_C(R, S) = \begin{cases} 0° \xrightarrow{if} Vstim(R, S) = Vstim+ \\ 180° \xrightarrow{if} Vstim(R, S) = Vstim- \end{cases}$$
= stimulation phase of $Vstim(R, S)$ for sense channel $C$ $Csig_C(R)$ = signal capacitance at the pixel corresponding to drive line $R$ of sense channel $C$ Equation (3) can be written in matrix form as:

$$\begin{bmatrix} Qsig\_tot_C(0) \\ Qsig\_tot_C(1) \\ Qsig\_tot_C(2) \\ \vdots \\ Qsig\_tot_C(P-1) \end{bmatrix} =$$

$$Vstim \times \begin{bmatrix} M_C(0,0) & M_C(1,0) & \ldots & M_C(M-1,0) \\ M_C(0,1) & M_C(1,1) & & \\ M_C(0,2) & M_C(1,2) & & \\ \vdots & & \vdots & \vdots \\ M_C(0,P-1) & M_C(1,P-1) & & M_C(M-1,P-1) \end{bmatrix} \times$$

$$\begin{bmatrix} Csig_C(0) \\ Csig_C(1) \\ Csig_C(2) \\ \vdots \\ Csig_C(M-1) \end{bmatrix}$$

where: $M_C(R, S) = \cos(Pz\_stim_C(R, S))$ or, in simplified form:

$$\tilde{Q}sig\_tot_C = Vstim \times \tilde{M}_C \times \tilde{C}sig_C \quad (4)$$

where: $\tilde{M}_C$ = the phase matrix for sense channel C

The Vstim×$\tilde{M}_C$ portion of equation (4) represents the selection of drive signals in stim matrix 407 in view of the particular processing methodology of the system. In particular, the entries in the phase matrix $\tilde{M}_C$ are the cosine values of the phases of the stimulation signals (cos(0°) for Vstim+ and cos(180°) for Vstim−). This representation accounts for the particular demodulation process used in the present example embodiment, which is described in more detail. Although different sense channels have the same phase matrix in this example embodiment, in other embodiments, the phase matrix may vary from sense channel to sense channel.

Thus, by stimulating the pixels of a channel with different combinations of Vstim signals, each combination of Vstim signals can be defined by a row in stimulation matrix that can be stored in the channel scan logic 210 of the touch sensor panel 1124, and obtaining the total signal charges Qsig_tot$_C$ from the sense signals resulting from the different stimulation combinations, for example, the signal capacitance Csig$_C$ at each pixel of the channel may be determined:

$$\tilde{C}sig_C = \frac{\tilde{M}_C^{-1}}{Vstim} \times \tilde{Q}sig\_tot_C \qquad (6)$$

where: $\frac{\tilde{M}_C^{-1}}{Vstim}$ = the decode matrix

However, while the stimulation matrix (and by extension, Vstim×$\tilde{M}_C$) represents the drive signals that are selected for each drive line for each step in a scan, the stimulation matrix might not reflect how the system is actually being stimulated once the drive signals are selected. In other words, the stimulation matrix may not capture other factors in the stimulation of pixels and the measurement of sense signals that may depend on the configuration and operation of the system. One example factor not taken into account by the stimulation matrix is variation in signal delay. FIG. 11, for example, illustrates that both the drive signals and the sense signals can have different signal path lengths in this particular example.

For the sake of clarity, FIG. 11 shows only drive signals 1111 (Vstim[0]) and 1113 (Vstim[M−1]), corresponding to drive lines 1104*a* and 1104*b* (the first and the last drive lines), and the resulting component signals 1117 and 1119 of sense signal SenseSig[0] generated on a sense line 1106*a* and component signals 1121 and 1123 of sense signal SenseSig[1] generated on sense line 1106*b* (the first and second sense lines). FIG. 11 illustrates that each sense signal is a composite signal formed by the superposition of multiple component signals generated at the sense line's pixels.

FIG. 11 illustrates that the length of a signal path from a transmit channel to a sense channel can be different depending on the particular drive line and sense line pair. For example, the signal path lengths of the component signals from the pixels to the receive channel can be different. In sense line 1106*a*, for example, the path length of component signal 1117 is longer than the path length of component signal 1119. Likewise, in sense line 1106*b*, the path length of component signal 1121 is longer than the path length of component signal 1123. In addition, the signal path lengths of the drive signals can vary by channel. For example, the path length from TransmitC[0] to pixel 1112 of drive line 1104*a* with sense line 1106*a* is less than the path length from TransmitC[0] to a pixel 1125 of drive line 1104*a* with sense line 1106*b*. For AC signals, for example, variations in the delays in the signals can cause the phases of the component signals to be different, which can be reflected in the superposition of the component signals forming the composite sense signal SenseSig used to obtain Qsig_tot$_C$. Therefore, a stimulation matrix (and therefore, Vstim×$\tilde{M}_C$) might not accurately reflect the how the sense signals are actually formed, e.g., because the stim matrix does not account for the signal delays in the system. Because the total signal charges Qsig_tot$_C$ of equation (3) are obtained from the sense signals, the resulting phase matrix might not yield accurate results for the Csig$_C$ values. However, the phase components of equation (3) may be modified to compensate for factors such as variation in phase delay associated with, for example, a particular drive/sense line pair.

For example, a phase delay associated with the stimulation signal of each pixel in a channel can be added to the corresponding phase components of equation (3):

$$Qsig\_tot_C(S) = Vstim \times \cos(Pz\_stim_C(0,S) + \Phi_C(0)) \times Csig_C(0) + Vstim \times \cos(Pz\_stim_C(1,S) + \Phi_C(1)) \times Csig_C(1) + \ldots Vstim \times \cos(Pz\_stim_C((M-1),S) + \Phi_C(M-1)) \times Csig_C(M-1) \qquad (6)$$

where: $\Phi_C$ (R)=the phase delay associated with drive line R of sense channel C The modified phase components result is a compensated phase matrix for that channel:

$$\tilde{M}_{C\_comp} = \qquad (7)$$

$$\begin{bmatrix} M_{C\_comp}(0,0) & M_{C\_comp}(1,0) & \ldots & M_{C\_comp}(M-1,0) \\ M_{C\_comp}(0,1) & M_{C\_comp}(1,1) & & \\ M_{C\_comp}(0,2) & M_{C\_comp}(1,2) & & \\ \vdots & \vdots & & \vdots \\ M_{C\_comp}(0,P-1) & M_{C\_comp}(1,P-1) & & M_{C\_comp}\binom{M-1,}{P-1} \end{bmatrix}$$

where: $M_{C\_comp}(R,S) = \cos(Pz\_stim_C(R,S) + \phi_C(R))$

The inverse of the compensated phase matrix is used as the decode matrix in equation (5):

$$\tilde{C}sig_C = \frac{\tilde{M}_{C\_comp}^{-1}}{Vstim} \times \tilde{Q}sig\_tot_C \qquad (8)$$

The decode matrix $$\frac{\tilde{M}_{C\_comp}^{-1}}{Vstim}$$

can be stored in decode matrix RAM 321 and used along with Qsig_tot$_C$ measurements obtained from the sense signals and stored in result memory 212 to determine Csig$_C$ values by calculating equation (8).

Viewing the stimulation steps and patterns as elements in a matrix can provide useful in describing stimulation sequences for the touch sensor panel. For instance the matrix depicted in equation (7) can be a Hadamard matrix, an identity matrix, or a circulant matrix.

Also, although examples herein describe certain circuit elements as being multi-function and other circuit elements as being single-function, it should be understood that the circuit elements are not limited to the particular functionality in other examples. In other words, a circuit element that is described in one example as a single-function circuit element may be configured as a multi-function circuit element in other examples, and vice versa.

Although examples of this disclosure have been fully described with reference to the accompanying drawings, it is to be noted that various changes and modifications including, but not limited to, combining features of different examples, omitting a feature or features, etc., as will be apparent to those skilled in the art in light of the present description and figures.

For example, one or more of the functions of computing system 200 described above can be performed by firmware stored in memory (e.g. one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (not including signals) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Examples may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the elements to a particular direction or a particular coordinate system. Furthermore, although specific materials and types of materials may be included in the descriptions of examples, one skilled in the art will understand that other materials that achieve the same function can be used. For example, it should be understood that a "metal layer" as described in the examples below can be a layer of any electrically conductive material.

In some examples, the drive lines and/or sense lines can be formed of other elements including, for example other elements already existing in typical LCD displays (e.g., other electrodes, conductive and/or semiconductive layers, metal lines that would also function as circuit elements in a typical LCD display, for example, carry signals, store voltages, etc.), other elements formed in an LCD stackup that are not typical LCD stackup elements (e.g., other metal lines, plates, whose function would be substantially for the touch sensing system of the touch screen), and elements formed outside of the LCD stackup (e.g., such as external substantially transparent conductive plates, wires, and other elements). For example, part of the touch sensing system can include elements similar to known touch panel overlays.

Although various examples are described with respect to display pixels, one skilled in the art would understand that the term display pixels can be used interchangeably with the term display sub-pixels in examples in which display pixels are divided into sub-pixels. For example, some examples directed to RGB displays can include display pixels divided into red, green, and blue sub-pixels. In other words, in some examples, each sub-pixel can be a red (R), green (G), or blue (B) sub-pixel, with the combination of all three R, G and B sub-pixels forming one color display pixel. One skilled in the art would understand that other types of touch screen could be used. For example, in some examples, a sub-pixel may be based on other colors of light or other wavelengths of electromagnetic radiation (e.g., infrared) or may be based on a monochromatic configuration, in which each structure shown in the figures as a sub-pixel can be a pixel of a single color.

Therefore, according to the above, some examples of the disclosure are directed to a touch sensitive device including a plurality of display pixels, the touch sensitive device comprising: a color filter layer; a first ITO layer, the first ITO layer containing circuit elements that can be configured to operate as both touch hardware and display hardware; a TFT layer; a liquid crystal layer disposed between the TFT layer and the color filter layer; and a second ITO layer, the second ITO layer disposed above the color filter layer. Additionally or alternatively to one or more examples disclosed above, the first ITO layer can be configured to act as drive lines in a mutual capacitance touch sensor during a touch mode of the device. Additionally or alternatively to one or more examples disclosed above, the drive lines of the first ITO layer are stimulated with signals that are based on the elements of a matrix stored in a memory of the touch sensitive device. Additionally or alternatively to one or more examples disclosed above, the matrix is a Hadamard matrix. Additionally or alternatively to one or more examples disclosed above, the matrix is a circulant matrix. Additionally or alternatively to one or more examples disclosed above, the matrix is an identity matrix. Additionally or alternatively to one or more examples disclosed above, the first ITO layer can switchably operate as display circuitry during a display mode of the device, and as touch circuitry during a touch mode of the device, and wherein the display and touch modes are time multiplexed.

Other examples of the disclosure are directed to an organic light emitting diode touch sensitive device including a plurality of display pixels, the device comprising: an encapsulation layer; a cathode layer, the cathode layer containing circuit elements that can be configured to operate as both touch hardware and display hardware; and an ITO layer, the ITO layer disposed above the encapsulation layer. Additionally or alternatively to one or more examples disclosed above, the cathode layer is configured to act as sense lines in a mutual capacitance touch sensor during a touch mode of the device. Additionally or alternatively to one or more examples disclosed above, the ITO layer is configured to act as drive lines in a mutual capacitance touch sensor during a touch mode of the device. Additionally or alternatively to one or more examples disclosed above, the drive lines of the ITO layer are stimulated with signals that are based on the elements of a matrix stored in a memory of the touch sensitive device. Additionally or alternatively to one or more examples disclosed above, the matrix is a Hadamard matrix. Additionally or alternatively to one or more examples disclosed above, the matrix is a circulant matrix. Additionally or alternatively to one or more examples disclosed above, the matrix is an identity matrix. Additionally or alternatively to one or more examples disclosed above, the cathode layer is configured to act as cathodes in an OLED display during a display mode of the device. Additionally or alternatively to one or more examples disclosed above, the cathode layer can switchably operate as display circuitry during a display mode of the device, and as touch circuitry during a touch mode of the device, and wherein the display and touch modes are time multiplexed.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An organic light emitting diode touch sensitive device including a plurality of display pixels, the device comprising:
    an encapsulation layer;
    a cathode layer, the cathode layer containing circuit elements that can be configured to operate as drive lines in a mutual capacitance touch sensor during a touch mode of the device and as display hardware during a display mode of the device;
    an anode layer, the anode layer containing circuit elements that can be configured to be stimulated when the drive lines of the cathode layer are stimulated during the touch mode of the device; and
    an ITO layer, the ITO layer disposed above the encapsulation layer.

2. The touch sensitive device of claim 1, wherein the cathode layer is configured to act as cathodes in an OLED display during a display mode of the device.

3. The touch sensitive device of claim 1, wherein the cathode layer can switchably operate as display circuitry during a display mode of the device, and as touch circuitry during a touch mode of the device, and wherein the display and touch modes are time multiplexed.

4. The touch sensitive device of claim 1, wherein the ITO layer is configured to act as sense lines in a mutual capacitance touch sensor during a touch mode of the device.

5. The touch sensitive device of claim 4, wherein the drive lines are arranged in vertical columns, while a plurality of sense lines of the device are arranged in horizontal rows.

6. The touch sensitive device of claim 4, wherein the drive lines are stimulated with signals that are based on elements of a matrix stored in a memory of the touch sensitive device.

7. The touch sensitive device of claim 6, wherein the matrix is a Hadamard matrix.

8. The touch sensitive device of claim 6, wherein the matrix is a circulant matrix.

9. The touch sensitive device of claim 6, wherein the matrix is an identity matrix.

* * * * *